(12) United States Patent
Saito et al.

(10) Patent No.: US 10,654,742 B2
(45) Date of Patent: May 19, 2020

(54) METHOD FOR TEMPERING GLASS PLATE, AND TEMPERED GLASS PLATE

(71) Applicant: AGC Inc., Chiyoda-ku (JP)

(72) Inventors: Isao Saito, Chiyoda-ku (JP); Yasumasa Kato, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/047,660

(22) Filed: Jul. 27, 2018

(65) Prior Publication Data

US 2019/0002332 A1      Jan. 3, 2019

Related U.S. Application Data

(63) Continuation of application No. PCT/JP2017/006425, filed on Feb. 21, 2017.

(30) Foreign Application Priority Data

Feb. 26, 2016  (JP) .................................. 2016-035876
Nov. 8, 2016   (JP) .................................. 2016-218290

(51) Int. Cl.
  *C03B 27/012*   (2006.01)
  *C03B 27/04*    (2006.01)
  (Continued)

(52) U.S. Cl.
  CPC ........ *C03B 27/012* (2013.01); *C03B 27/0413* (2013.01); *C03B 29/025* (2013.01); *C03B 29/08* (2013.01); *C03C 21/002* (2013.01)

(58) Field of Classification Search
  CPC .................................................... C03B 27/012
  (Continued)

(56) References Cited

U.S. PATENT DOCUMENTS 3,169,900 A   2/1965  Ermlich, Jr.
3,406,022 A   10/1968 Gehenot
              (Continued)

FOREIGN PATENT DOCUMENTS

EP   1 549 591       7/2005
EP   2 565 168 A1    3/2013
              (Continued)

OTHER PUBLICATIONS

Machine English Translation_JP_2005162561_A; Yuki, K., Method of Manufacturing Thermally Tempered Glass; Jun. 23, 2005, EPO; whole document (Year: 2005).*

(Continued)

*Primary Examiner* — Tahseen Khan
(74) *Attorney, Agent, or Firm* — Oblon, McClelland, Maier & Neustadt, L.L.P.

(57) ABSTRACT

To provide a method for tempering glass to obtain tempered glass having high surface quality and a deep compression stress layer. The present invention relates to a method for tempering a glass plate comprising a preparation step of preparing a glass plate having a surface temperature of at most the strain point, an internal heating step of heating the internal temperature of the glass plate to be at least the annealing point, while maintaining the surface temperature of the glass plate within 10 minutes, or to be at most the strain point, and a cooling step of cooling the glass plate.

9 Claims, 9 Drawing Sheets

(51) Int. Cl.
*C03B 29/02* (2006.01)
*C03B 29/08* (2006.01)
*C03C 21/00* (2006.01)

(58) Field of Classification Search
USPC .......................................................... 428/215
See application file for complete search history.

(56) References Cited

U.S. PATENT DOCUMENTS

| | | | |
|---|---|---|---|
| 3,650,719 A * | 3/1972 | Van Laethem | ......... C03B 27/03 |
| | | | 65/30.14 |
| 3,938,980 A | 2/1976 | French | |
| 5,656,053 A | 8/1997 | Boaz | |
| 2003/0037570 A1 | 2/2003 | Sklyarevich et al. | |
| 2013/0019639 A1* | 1/2013 | Saito | ................... C03B 27/0404 |
| | | | 65/114 |
| 2013/0047673 A1* | 2/2013 | Lee | ...................... C03B 35/188 |
| | | | 65/114 |
| 2015/0284283 A1 | 10/2015 | Sklyarevich et al. | |
| 2016/0031739 A1 | 2/2016 | Lezzi et al. | |
| 2016/0347656 A1* | 12/2016 | Kawamoto | ............... C03C 4/18 |

FOREIGN PATENT DOCUMENTS

| | | | | |
|---|---|---|---|---|
| JP | 53-1212 | | 1/1978 | |
| JP | 55-62816 | | 5/1980 | |
| JP | 59-227732 | | 12/1984 | |
| JP | 59-227733 A | | 12/1984 | |
| JP | 59227732 A | * | 12/1984 | .......... C03B 27/004 |
| JP | 2003-261344 A | | 9/2003 | |
| JP | 2005-162561 | | 6/2005 | |
| JP | 2005162561 A | * | 6/2005 | .......... C03B 27/044 |
| JP | 2013-53062 | | 3/2013 | |
| JP | 5155873 | | 3/2013 | |
| JP | 2015-512851 | | 4/2015 | |

OTHER PUBLICATIONS

Machine English translation_JP_59227732_A; Suga, K.; Apparatus for Reinforcing Glass Plate; Dec. 21, 1984; EPO; whole document (Year: 1984).*
International Search Report dated May 16, 2017 in PCT/JP2017/006425, filed on Feb. 21, 2017 (with English Translation).
Gardon, R. "Thermal Tempering of Glass", Glass Science and Technology, vol. 5, 1980, pp. 145-216.
Ohara Inc., "Thermal Properties", retrieved from http://www.ohara-inc.co.jp/en/product/optical/opticalglass/01003.html on Aug. 5, 2019.

* cited by examiner

METHOD FOR TEMPERING GLASS PLATE, AND TEMPERED GLASS PLATE

TECHNICAL FIELD

The present invention relates to a method for tempering a glass plate capable of forming a deep compressive stress layer, and a tempered glass plate.

BACKGROUND ART

Heretofore, as a method for tempering a glass plate, a chemical strengthening method for forming a chemically strengthened layer at the surface layer of a glass plate by using ion exchange, or a physical tempering method for forming a compressive stress layer at the surface layer of a glass substrate by quenching the surface of the heated glass substrate as disclosed in Patent Document 1, is known.

PRIOR ART DOCUMENTS

Patent Documents

Patent Document 1: Japanese Patent No. 5155873
Patent Document 2: JP-A-S59-227732
Patent Document 3: U.S. Patent Application Publication No. 2016/0031739
Patent Document 4: JP-A-2015-512851

Non-Patent Document

Non-Patent Document 1: Gardon, R., Thermal Tempering of Glass, Uhlmann, D. R. and Kreidl, N. j. (eds), Glass Science and Technology, Vol. 5 (1980), Academic Press, 145-216

DISCLOSURE OF INVENTION

Technical Problem

However, in the above physical tempering method, the glass plate was heated to near the softening point, whereby, for example, a trace of the cooling medium sprayed on the surface of the glass plate during the quenching, or a contact trace of the transport roller for transporting the glass plate, was likely to remain on the surface of the glass plate, and thus, there was a risk of lowering the surface quality of the glass plate.

Further, in the above physical tempering method, it was not possible to use, as the glass plate, one having a coating film with a low heat resistance formed on its surface, or one having the above-mentioned chemically strengthened layer formed. This is because the coating film or the chemically strengthened layer would be altered by the heat when heated to near the softening point, and thus, the surface quality of the glass plate would be lowered.

Furthermore, in the above physical tempering method, the tempering is conducted by quenching the surface from such a state that the entire plate thickness is stress-relaxed, whereby the thickness of the compressive stress layer can be made to be only about ⅕ of the thickness of the glass plate at the maximum, and therefore, it has been desired to provide a new method for tempering a glass plate, whereby it is possible to form the compressive stress layer more deeply.

Patent Document 2 discloses a method wherein dielectric heating is utilized to heat a glass plate, and for quenching, the glass plate is cooled by a clamping jig to clamp the glass plate (so-called clamp cooling). In this method, a high surface compressive stress can be formed, since the center and the surface of the glass plate pass through the strain point temperature of the glass plate with a large temperature difference. However, in this method, the glass plate is heated to from about 550° C. to 650° C., and thus, a comparatively high temperature is assumed for the surface of the glass plate. Further, in this method, no means or method for forming a deep compressive stress layer is disclosed.

Patent Document 3 discloses another physical tempering method different from the above physical tempering method. In this method, the maximum compressive stress at the surface is from 2.0 to 3.0 times the maximum tensile stress at the center of the glass plate. However, the integrated value of the compressive stress and the integrated value of the tensile stress inside of the glass plate are required to take a balance within the glass plate. Therefore, in this method, the compressive stress layer at the surface becomes inevitably shallow.

Non-Patent Document 1 discloses that in the physical tempering method, the maximum compressive stress at the surface exceeds at least 1.6 times of the maximum tensile stress at the center of the glass plate. As mentioned above, the integral value of the compressive stress and the integral value of the tensile stress inside of the glass plate are required to take a balance in the glass plate. Therefore, in a case where the maximum compressive stress at the surface exceeds 1.6 times of the maximum tensile stress at the center of the glass plate, the compressive stress layer could only be formed to have the same level of depth as the conventional one.

Patent Document 4 discloses a method of laminating glass layers different in glass matrix composition in order to deepen the compressive stress layer. Like in this method, if the matrix compositions of glass are different, it is possible to deepen the compressive stress layer. However, this method is not one to envisage tempered glass wherein the glass compressive stress layer is deeply formed by using glass with a single matrix composition. Further, as far as the present inventors know, there is no literature which discloses a technique concerning tempered glass wherein the compressive stress layer is deeply formed by using glass with a single matrix composition.

The present invention has been made to solve the above problem, and has an object to provide a tempered glass plate having a single matrix composition and having a deep compressive stress layer, and a method for tempering a glass plate.

Solution to Problem

According to one embodiment of the present invention, a tempered glass plate is provided which is one made of glass with a single matrix composition and having a first main surface and a second main surface opposed to each other, characterized in that the tempered glass plate has a compressive stress layer at its surface, wherein in the distribution of stress remaining in a cross section passing through the center of the first main surface and being perpendicular to the first main surface, the depth from the first main surface where the compressive stress component in a direction parallel to the first main surface becomes zero, is at least 22% of the plate thickness of the tempered glass plate.

According to one embodiment of the present invention, a method for tempering a glass plate is provided which is characterized by comprising a preparation step of preparing a glass plate made of a glass with a single matrix composition having a surface temperature of at most the strain point, an internal heating step of heating the internal temperature of the glass plate to be at least the annealing point, while maintaining the surface temperature of the glass plate to be higher than the strain point and at most the annealing point within 10 minutes, or to be at most the strain point, and a cooling step of cooling the glass plate.

According to one embodiment of the present invention, a method for tempering a glass plate to produce the above tempered glass plate, is provided which comprises a preparation step of preparing a glass plate made of a glass with a single matrix composition having a surface temperature of at most the strain point, an internal heating step of heating the internal temperature of the glass plate to be at least the annealing point, while maintaining the surface temperature of the glass plate to be higher than the strain point and at most the annealing point within 10 minutes, or to be at most the strain point, and a cooling step of cooling the glass plate.

Here, the glass plate to be prepared in this preparation step may be one produced by a party to carry out the tempering method, or may be one purchased from a third party.

Advantageous Effects of Invention

According to the present invention, it is possible to provide a tempered glass plate with a single matrix composition, having a deep compressive stress layer. Further, according to the method for tempering a glass plate of the present invention, it is possible to form a compressive stress layer thickened to a deep position in the glass plate.

DESCRIPTION OF EMBODIMENTS

The following describes one embodiment of the method for tempering a glass plate of the present invention with reference to the drawings.

Figure 1:
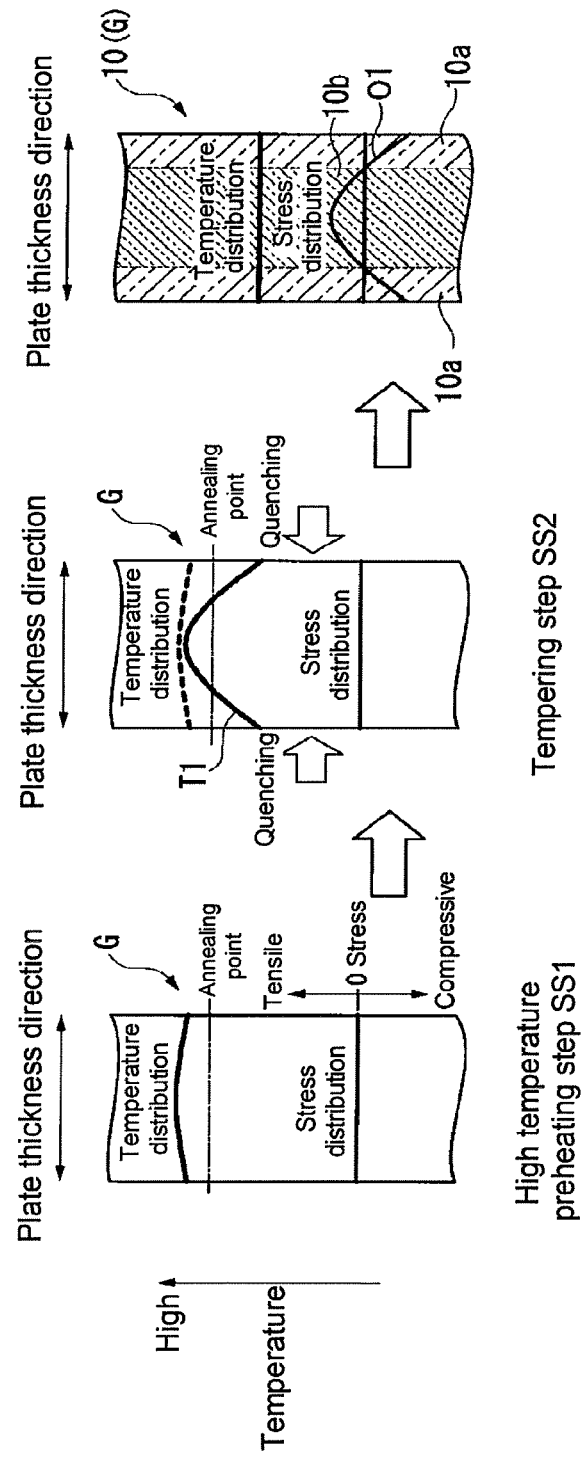
FIG. 1 shows the respective steps in conventional common air cooling tempering of a glass plate.
Figure 2:
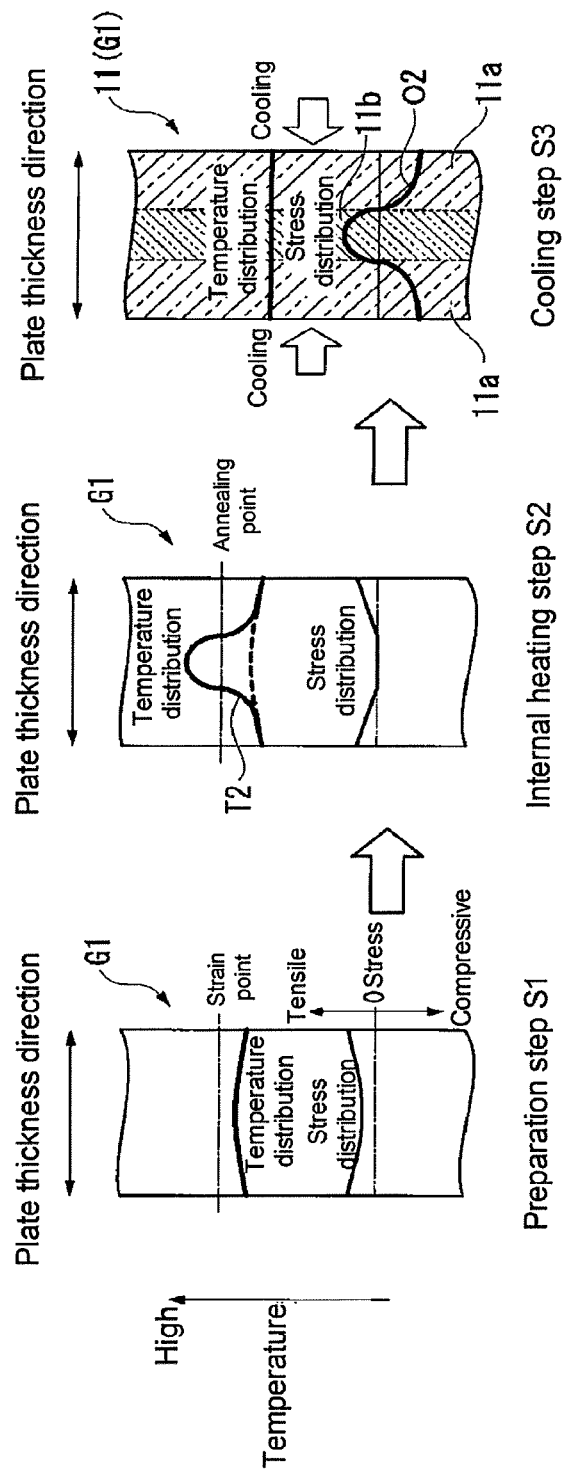
FIG. 2 is a process diagram showing a method of tempering a glass plate in an embodiment of the present invention.

As indicated by the arrows in FIGS. 1 and 2, the temperature becomes higher towards the top, and the stress is tensile at the upper side of 0 and compressive at the lower side. In the following drawings, in order to facilitate understanding of characteristics, portions representing the characteristics may be shown as enlarged for convenience sake, and therefore, dimensional ratios of the respective components, etc. may not necessarily be the same as real ones.

Prior to description of the method for tempering a glass plate in the embodiment of the present invention, an air cooling tempering method as a conventional common physical tempering method of glass will be described. FIG. 1 is a diagram showing the respective steps in air cooling tempering of a glass plate. In the following description, as a glass plate, for example, plate-shaped soda-lime glass (softening point: 730° C., annealing point: 550° C., strain point: 510° C.) is used.

In the present invention, the "softening point" means the temperature measured in accordance with JIS R3103-1: 2001, the "annealing point" means the temperature measured in accordance with JIS R3103-2: 2001, and the "strain point" means the temperature measured in accordance with JIS R3103-2: 2001.

As shown in FIG. 1, the air cooling tempering process comprises a high temperature preheating step SS1 and a tempering step SS2. In the high-temperature preheating step SS1, a glass plate G to be tempered is uniformly heated to a temperature near the softening point. At that time, the glass plate G becomes to have a temperature higher than the annealing point over the entire area in the plate thickness direction. Therefore, in the glass plate G, the stress distribution over the entire area in the thickness direction is reduced, and the stress is in a constant state.

In the tempering step SS2, the surface of the glass plate G heated above the annealing point, is subjected to quenching. Here, quenching is meant for rapid cooling by blowing a cooling medium (e.g. air) to the surface of the glass plate G in order to temper the glass plate heated above the annealing point as described above at a cooling rate of at least natural cooling. Specifically, it is meant for rapidly removing heat from the surface of the glass plate to be cooled, using an active cooling means such as air cooling by blowing equipment or high-pressure gas, liquid cooling, mist cooling, contact type cooling, etc. to cool the surface of the glass plate heated above the annealing point. The cooling medium may be any fluid, and a liquid, a gas, or a mixture of liquid and gas, may suitably be employed. Further, the composition of the cooling medium is not particularly limited, and in addition to air, nitrogen, carbon dioxide, etc. may be used.

In the tempering step SS2, in the glass plate G cooled from the surface side, the internal shrinkage is prevented by the cured surface layer, whereby a force to balance the distortion between the interior and the surface layer each other, will be formed. Specifically, in the glass sheet G, a compressive stress will be formed in the surface layer by the tensile stress formed in the interior. Therefore, by cooling the glass plate G to room temperature, it is possible to obtain a tempered glass plate 10 having such a stress distribution O1 that the tensile stress remains in the interior, and the compressive stress remains in the surface layer, in the thickness direction. Thus, the tempered glass plate 10 will be one having the compressive stress layer 10a in the surface layer, and the tensile stress layer 10b in the interior.

Here, the stress distribution profile to be formed in the thickness direction of the tempered glass plate 10 will be one corresponding to the temperature distribution profile formed in the glass plate G at the time of the quenching. Since the temperature distribution in the plate thickness direction is determined by the thermal conductivity of the glass plate G, in the air cooling tempering step of cooling the glass plate G from the surface side, the temperature distribution T1 to be formed in the glass plate G in the tempering step SS2 will become generally parabolic. That is, also the stress distribution O1 to be formed in the tempered glass 10 will become generally parabolic.

In tempered glass 10, the balance is maintained as a whole, between the compressive stress layers 10a formed in the surface layer and the tensile stress layer 10b formed in the interior. Therefore, in the above parabolic stress distribution O1, the thickness of each of compressive stress layers 10a will be theoretically about 21% of the thickness of the glass plate G. That is, in the physical tempering method by the conventional air cooling tempering, theoretically, the compressive stress layer thickness at each of the front and back surfaces can be made to be only a thickness of about ⅕ of the thickness of the glass plate at the maximum, and realistically it used to be remained to be a thickness of about ⅙ of the thickness of the glass plate.

Whereas, according to the method for tempering a glass plate in the present embodiment, it is possible to deeply form compressive stress layers in comparison with the air cooling tempering process, as described below.

Next, an embodiment of the method for tempering a glass plate of the present invention will be described.

FIG. 2 is a process diagram showing a method for tempering a glass plate in the present embodiment. As shown in FIG. 2, the method for tempering a glass plate in the present embodiment (hereinafter referred to simply as the tempering method) comprises a preparation step S1, an internal heating step S2 and a cooling step S3.

The preparation step S1 is a step of preparing a glass plate made of glass with a single matrix composition to be tempered, wherein a glass plate having the surface temperature maintained to be at most the strain point (510° C. in the case of soda lime glass) is prepared. Here, the glass with a single matrix composition is meant for glass obtained by melting based on a single target composition in a melting step. Therefore, it is different from one formed in a plate shape by laminating molten glass materials with different compositions, or different from one obtained by laminating glass plates even with the same composition.

In the preparation step S1, the surface temperature and the internal temperature of the glass plate G1 are made to be almost the same temperature (temperature of at most the strain point), whereby the stress distribution formed in the interior of the glass plate G1 is not practically reduced.

In the present embodiment, in the preparation step S1, a heating furnace to heat the entire glass plate G1 to a high temperature of above the strain point as in the conventional air cooling tempering process, is not used, and thus, energy saving in the process of tempering glass is accomplished.

Here, the surface temperature of the glass plate G1 may be at most the strain point (510° C. in the case of soda lime glass), and it may, for example, be at a normal temperature, but is preferably to be matched with the temperature at which the surface of the glass plate G1 is maintained in the internal heating step S2 as will be described later. In this way, it is possible to start the internal heating step S2 without adjusting the temperature of the glass plate G1 prepared in the preparing step S1.

In the internal heating step S2, the internal temperature of the glass plate G1 is heated to at least the annealing point, while the surface of the glass plate G1 prepared in the above preparation step S1 is maintained to be higher than the strain point and at most the annealing point within 10 minutes, or to be at most the strain point. Here, the interior of the glass plate G1 means a portion including the vicinity of the center and excluding at least the surface, in the thickness direction of the glass plate G1.

In the internal heating step S2, since the surface temperature of the glass plate G1 is maintained to be higher than at least the strain point and at most the annealing point only within 10 minutes, or to be at most the strain point, even if exposed to a temperature higher than the strain point, stress relaxation will not substantially occur. Here, the stress relaxation is, with respect to a stress to be formed by a temperature distribution formed by heating or cooling a glass plate, a value obtained by subtracting the time-dependent stress formed in the viscoelastic state, from the stress formed when the glass plate is assumed to be an elastic body. That is, if the heating temperature is high and the passed time is long, the stress formed in the viscoelastic state becomes small, and the stress relaxation becomes large.

In the internal heating step S2, while selectively heating the interior, the temperature at the surface in the case of higher than the strain point and at most the annealing point is maintained for only within 10 minutes, and thus, even if higher than the strain point, such a time is short, whereby the contribution of the plate thickness direction temperature distribution near the surface to the final plate thickness direction stress distribution is small, and it is possible to form a deep compressive stress layer without raising the temperature of the surface. Further, in the internal heating step S2, since the surface of the glass plate G1 is maintained only within 10 minutes when the temperature is higher than the strain point and at most the annealing point, or is maintained to be at most the strain point, the softening of the surface of the glass plate G1 is prevented. Thus, it is possible to prevent deterioration of the surface quality of the glass plate G1 in the cooling step S3 as will be described later.

In the internal heating step S2, the surface temperature of the glass plate G1 may be maintained to be higher than the strain point and at most the annealing point within 10 minutes, or to be at most the strain point, and, for example, may be maintained at room temperature. When the surface temperature of the glass plate G1 is maintained to be at most the strain point, it is possible to suppress the stress relaxation of the surface of the glass plate G1 in comparison to the annealing point.

Here, with a view to suppressing the stress relaxation of the surface of the glass plate G1, it is effective to keep the surface temperature to be low, but in consideration of the internal heating as described later, it is preferred to maintain the surface temperature of the glass plate G1 to be about a several hundred degrees (e.g. preferably at least 200° C., more preferably at least 300° C., whereas, preferably at most the strain point, more preferably at most the strain point minus 50° C.).

In the present embodiment, by selectively heating the glass plate G1, the internal temperature of the glass plate G1 is heated to be at least the annealing point. In the internal heating step S2, with a view to attaining a deeper compressive stress layer, preventing cracking during heating, etc., the heating is preferably conducted so that the internal temperature of the glass plate G1 would be at most the annealing point plus 50° C. and at most 600° C. By heating the internal temperature to be, for example, at least the strain point plus 30° C. and at most the annealing point plus 30° C., it is possible to suppress the NIS (nickel sulfide) transformation from taking place in the glass plate G1, and to obtain highly reliable tempered glass.

As a method for locally heating the interior of the glass plate G1, for example, dielectric heating with a high-frequency electric field may be exemplified. The dielectric heating is, for example, one to apply a high frequency to a glass plate placed between a pair of electrodes. Therefore, the size of the heating region formed in the interior of the glass plate by the dielectric heating will correspond to the region where the high frequency is applied, i.e. the area of the electrodes.

In a case where electrodes with a size equal to or larger than a glass plate G1 are used, it is possible to conduct internal heating for the entire area of the surface of the glass plate G1. On the other hand, in the case of using electrodes smaller than the glass sheet G1, it is possible to conduct internal heating for a partial area of the surface of the glass plate G1. Here, the size of the glass plate G1 or electrodes, is meant for the size (area) of the glass plate G1 or electrodes in the state as viewed in plane.

Therefore, in the case of using dielectric heating, by suitably adjusting the area of the electrodes to the surface of the glass plate G1, it is possible to conduct internal heating of at least a partial region (corresponding to the size of the electrodes) of the surface of the glass plate G1. That is, according to the present embodiment, it is possible to provide a tempered glass having physical tempering applied to at least a part of the surface of the glass plate G1.

Further, by the dielectric heating, heating can be conducted in proportion to the magnitudes of the physical property values of the dielectric loss and dielectric constant of the glass plate. Such physical property values increase as the temperature as a characteristic of the glass plate is high, and therefore, if a high temperature portion and a relatively low temperature portion are present in the glass plate G1, the high-temperature portion having larger physical property values will be exothermed at high efficiency by dielectric heating, whereby the temperature difference between the high temperature portion and the low-temperature portion will be further expanded. Accordingly, in the present embodiment, at the time of using dielectric heating, at least the internal temperature of the glass plate G1 is made to be higher than the temperature of the surface.

Further, dielectric heating has such a characteristic that as the temperature of the glass sheet G1 becomes high, the dielectric loss becomes large, and the heat generation quantity increases. In the present embodiment, a preheating step of preheating the glass sheet G1 to at least 200° C. is provided in the preparation step S1. By thus preheating the glass sheet G1, the voltage to be applied at the time of conducting dielectric heating can be suppressed, and it will be possible to satisfactorily conduct dielectric heating. Further, by preheating the glass plate G1, it is possible to prevent heat cracking of the glass plate G1 at the time of internal heating.

Further, in the present embodiment, in the internal heating step S2, by blowing a cooling medium to the surface of the glass plate G1, the surface is forcibly cooled. By thus forcibly cooling the surface of the glass plate G1, it is possible to suppress an increase in the surface temperature of the glass sheet G1 due to transmission of the internal heat. Thus, by maintaining the temperature difference between the surface and the interior of the glass plate G1, the above-mentioned dielectric heating will be generated well, and it is possible to heat the interior of the glass plate G1 selectively and more efficiently. Further, it is possible to prevent occurrence of such troubles in the surface quality that as the fluidity occurs at the surface of the glass plate G1, distortions, scratches or irregularities may occur at the surface of the glass plate G1.

In the internal heating step S2, heating is preferably conducted so that the temperature difference between the maximum and minimum temperatures in the thickness direction of the glass plate G1, would be, for example in the case of soda lime glass, preferably at least 50° C., more preferably from 80 to 200° C. In such a way, it is possible to form a compressive stress layer deeply from the surface layer of the glass plate G1 by the cooling step S3 which will be described later.

Thus, in the internal heating step S2, since the interior of the glass plate G1 is selectively heated to be at least the annealing point, a temperature distribution T2 different from the parabolic temperature distribution T1 will be formed in the glass plate G1.

Specifically, the temperature distribution T2 has a region of at least the annealing point at a position deeper (near the center) in the thickness direction of the glass plate G1 as compared to the above-mentioned parabolic temperature distribution T1. Therefore, the glass plate G1 has a stress relaxation state only in the vicinity of the center in the thickness direction.

Then, in the cooling step S3, the temperature of the entire glass plate G1 is cooled to room temperature. In the present embodiment, the cooling step S3 includes a case where the glass plate G1 is left to cool naturally.

Here, "left to cool naturally" means such a phenomenon that when a high temperature glass plate G1 is placed in an atmosphere having a lower temperature than the temperature of the glass plate G1, the temperature of the glass plate G1 gradually decreases. Specifically, it means e.g. an unavoidable and passive temperature decrease such as a temperature decrease when the glass plate G1 is conveyed or left to stand by a conveying device having no heating means.

In a case where the glass sheet G1 is cooled by being left to cool naturally, since an air-blowing facility for quenching the glass sheet G1 as in the conventional air cooling tempering step is unnecessary, energy saving can be accomplished for the step for tempering the glass.

By the cooling step S3, a tempered glass plate 11 made of a glass plate G1 having a stress distribution O2 in the thickness direction is obtainable. The tempered glass plate 11 has a compressive stress layer 11a at the surface layer and a tensile stress layer 11b in the interior.

Here, the stress distribution O2 to be formed in the glass plate G1 becomes to have a shape that corresponds to the temperature distribution T2 formed in the thickness direction as described above. In the glass plates G1, since the stress is locally relaxed only in the vicinity of the center in the plate thickness direction by the temperature distribution T2, a stress remains in the vicinity of the center of the glass plate G1 after the cooling.

Thus, as compared with the tempered glass plate 10 having said parabolic stress distribution O1, the tempered glass 11 having the stress distribution O2 has a compressive stress layer 11a formed deeper in the surface layer of the glass plate G1. Further, the stress distribution is, as is different from the conventional common substantially parabolic shape as shown in FIG. 1, capable of forming a substantially stepwise stress distribution having a plurality of inflection points towards the center from the surface of the glass plate, as shown by O2 in FIG. 2. Such a tempered glass plate 11 can be suitably used, for example, as a safety glass plate for a vehicle window or a cover glass plate for display.

Here, the depth of the compressive stress layer depends on the shape of the stress distribution O2. That is, it is possible to adjust the depth of the compressive stress layer by suitably adjusting the shape of the temperature distribution T2 to cause the stress distribution O2. Further, the temperature distribution T2 changes according to the thickness of the heating region (the thickness of the region which becomes to be at least the annealing point) formed in the interior of the glass plate G1 by selective internal heating. Therefore, if the thickness of the heating region is made thin, it is possible to make the tensile stress layer to be formed in the interior of the glass plate G1 to be relatively thin, and to make the depth of the compressive stress layer to be formed at the surface layer of the glass plate G1 to be relatively large.

In the present embodiment, conditions for selective internal heating are set so that the thickness of the heating region would be at most 50% of the plate thickness of the glass plate G1. This makes it possible to form a compressive stress layer deeply in the surface layer of the glass plate G1. Here, the conditions for using dielectric heating can be set, for example, by properly adjusting the frequency, the electric field strength and the electrode shape at the time of generating a high frequency. Further, the thickness of the heating region should better be thinner, since it is thereby possible to increase the temperature difference between the surface and the interior. Therefore, the thickness of the heating region is more preferably at most 20%, further preferably at most 10%, of the plate thickness of the glass plate G1.

Further, in the cooling step S3, the surface may be forcibly cooled by blowing a cooling medium to the surface of the glass plate G1. Thus, by forcibly cooling the surface of the glass plate G1, it is possible to suppress an increase in the surface temperature of the glass sheet G1 due to transmission of the internal heat and to lower the temperature of the entire glass sheet G1 in a short time.

According to the present embodiment, in a series of process steps including the preparation step S1 and the internal heating step S2, the surface temperature of the glass plate G1 is maintained to be at most the annealing point, or to be exceeding the strain point and at most the annealing point in a short time (within 10 minutes), there is no possibility that the surface of the glass plate G1 softens. Therefore, even in the case of cooling by blowing a cooling medium to the surface of the glass plate G1 as described above, there is no possibility that blowing traces of the cooling medium will remain on the surface of the glass plate G1. Further, for example, even in a case where there is a step of conveying the glass plate G1 by using conveying rollers in the middle of the tempering process, the contact traces by the conveying rollers will not remain on the surface of the glass plate G1. That is, according to the present embodiment, it is possible to prevent deterioration in surface quality to be caused by softening of the surface of the glass plate G1.

According to the tempering method of the present embodiment, it is possible to provide a tempered glass plate 11 made of a glass plate G1 having a high surface quality and having a deep compressive stress layer 11a.

In the foregoing, an embodiment of the method for tempering a glass plate has been described, but the present invention is not limited to the above content, which may be suitably modified within the scope of the present invention. For example, in one embodiment of the present invention, it is possible to apply the physical tempering to a glass plate having preliminarily chemically strengthened. Thereby, the stress distribution formed and remaining in the glass plate by a chemical strengthening treatment by ion exchange, and the stress distribution formed and remaining by internal heating as described above, may be superimposed. In such a case, the glass plate may be chemically strengthened in the preparation step S1. That is, the preparation step S1 may include the step of chemically strengthening the glass plate. The chemical strengthening step is one to form a compressive stress layer at the surface of a glass plate by exchanging alkali ions in the glass plate with other alkali ions in a molten salt. As the chemical strengthening treated glass plate, for example, one having at least one surface among the front and back surfaces tempering-treated, may be used.

As a glass plate to be used for the chemical strengthening, it is preferred to use, rather than the above-mentioned soda-lime glass, aluminosilicate glass having a higher replacement speed of Na ions and K ions. By using such aluminosilicate glass, it is possible to form a compressive stress layer with a larger stress deeply in the surface layer.

In the chemical strengthening step, the temperature of the glass plate becomes to be a relatively high temperature (about 400° C.). Therefore, the chemical strengthening step may be used as a preheating step before the internal heating step S2. In this way, the glass plate will be in a preheated state by the chemical strengthening step, and therefore, this may be effectively used in the case of using dielectric heating for the internal heating of the glass plate. Further, since the glass plate is preheated, it is possible to suppress thermal cracking of the glass plate at the time of the internal heating. Further, it is possible to effectively utilize the heat formed in the glass plate by the chemical strengthening step.

Further, if the surface temperature of the chemically strengthened glass plate becomes to be, for example, higher than 400° C., ions in the surface layer tend to be easily diffused into the interior, whereby the function of the compressive stress layer formed by chemical strengthening is likely to decrease. Therefore, by the conventional air cooling tempering step wherein the surface of the glass plate becomes high (near the softening point), it was impossible to perform physical tempering to the glass plate subjected to chemical strengthening.

Further, JP-A-2006-253001 discloses a method wherein, with respect to a glass panel of a cathode-ray tube bulb, a compressive stress layer chemically strengthened by ion exchange is formed at the outside surface of the glass panel, and by controlling the cooling rate in a cooling process after the ion exchange, physical tempering is further applied to the surface of the glass panel portion. However, in this method, the thickness of the physically tempered compressive stress layer is from 2.0 mm and less than 3.5 mm, and the degree of the surface compressive stress is characterized by being at least 3.0 MPa and less than 8.5 MPa, and the method is not intended for a glass plate, and it is different from the conventional air cooling tempering process or from the process of the method for tempering a glass plate of the present invention, and further, its effects are different from the present invention.

Whereas, in one embodiment of the present invention, in the internal heating step S2, by conducting the heating in such a state that the surface temperature of a glass plate subjected to chemical strengthening, is maintained to be, for example, at most 400° C., it is possible to temper the glass plate while suppressing an influence to the chemically strengthened layer. That is, according to an embodiment of the present invention, it is possible to suppress a decrease in the surface quality of the chemically strengthened glass substrate (to suppress a decrease in the compressive stress of the compressive stress layer formed by chemical strengthening), and to form a compressive stress layer by physical tempering deeply in the surface layer. Here, the upper limit of the surface temperature of the glass plate is set to be 400° C., but, for the purpose of preventing a decrease in the compressive stress of the compressive stress layer formed by chemical strengthening, the surface temperature of the glass plate should better be low, and may be preferably at most 300° C., more preferably at most 200° C., further preferably at most 100° C.

Further, in one embodiment of the present invention, the surface of the glass plate will not become a high temperature as compared to the conventional air cooling tempering process, whereby even to a glass plate in which a coating film having a relatively low heat resistance (the heat resistant temperature being lower than the annealing point) is formed on the surface, it is possible to apply physical tempering while maintaining the coating function without lowering the surface quality (coating film).

Thus, according to the tempering method of the present invention, in a series of process steps, the surface of the glass plate is maintained to be higher than the strain point and at most the annealing point for only a short time, whereby it is possible to form a deep compressive stress layer with a high surface quality, even to a glass plate which used to be difficult to be tempered by the conventional air cooling tempering process.

Further, in the above embodiment, dielectric heating by high frequency by means of a pair of electrodes sandwiching the glass plate was exemplified as a means for conducting internal heating of the glass plate, but the present invention is not limited thereto. For example, the interior may be heated by using a microwave, or heating may be carried out by transmitting light with a predetermined wavelength from the front surface (one surface) side to the back surface (the other surface) side of the glass plate. In such a case, by properly setting the wavelength and intensity of light to be transmitted through the glass plate and the illumination profile, it is possible to selectively heat the interior by letting a part of the light be linearly absorbed in the interior of the glass plate.

Further, in the above embodiment, a case of using a plate-shaped glass plate is exemplified, but the present invention is applicable not only to a plate-shaped glass plate but also to a case of tempering a glass plate of a curved shape. It is thereby possible to produce a tempered glass plate having a curved shape suitable for a safety glass plate for a vehicle.

Further, also with respect to a glass plate having a thin plate thickness, the present invention is capable of forming a compressive stress layer deeply without decreasing the surface quality. Further, since the thickness of the glass plate becomes thin, the raw material required for the production of the glass plate will be less, whereby the energy required for producing the glass plate can be saved, and it becomes possible to provide a tempered glass friendly to environment. According to the present invention, with respect to a glass plate having a plate thickness of from 0.5 to 25 mm, it is possible to form a compressive stress layer deeply without reducing the surface quality.

Thus, the present invention is capable of providing tempered glass thinner than before and excellent in the surface quality, not only as safety glass for a vehicle window, but also in fields of architecture, display, cover glass for display, medical, optical instruments, cover glass for solar cell, interior glass, automotive interior glass, glass speakers, etc.

The excellent tempered glass of the present invention is useful not only as safety glass for a vehicle window, but also in fields of architecture, display, cover glass for display, medical, optical instruments, cover glass for solar cell, interior glass, automotive interior glass, glass speakers, etc.

EXAMPLES

In the following, the present invention will be described with reference to Examples, but the present invention should not to be construed as being limited to these Examples.

Example 1

Now, with reference to FIGS. 3 to 6, Example 1 will be described. In Example 1, a simulation was made with respect to the stress distribution of tempered glass to be obtained. Here, the simulation was carried out with respect to a tempered glass plate having a thick plate thickness obtained by temper-treating a glass plate made of soda lime glass with a single matrix composition having a plate thickness of 10 mm, and a tempered glass plate having a thin plate thickness obtained by temper-treating a glass plate made of soda lime glass with a single matrix composition having a plate thickness of 2 mm. Each tempered glass plate has a front surface (first main surface) and a back surface (second main surface) opposed to each other, and the front and back surfaces of the glass plate are parallel to each other.

Figure 3:
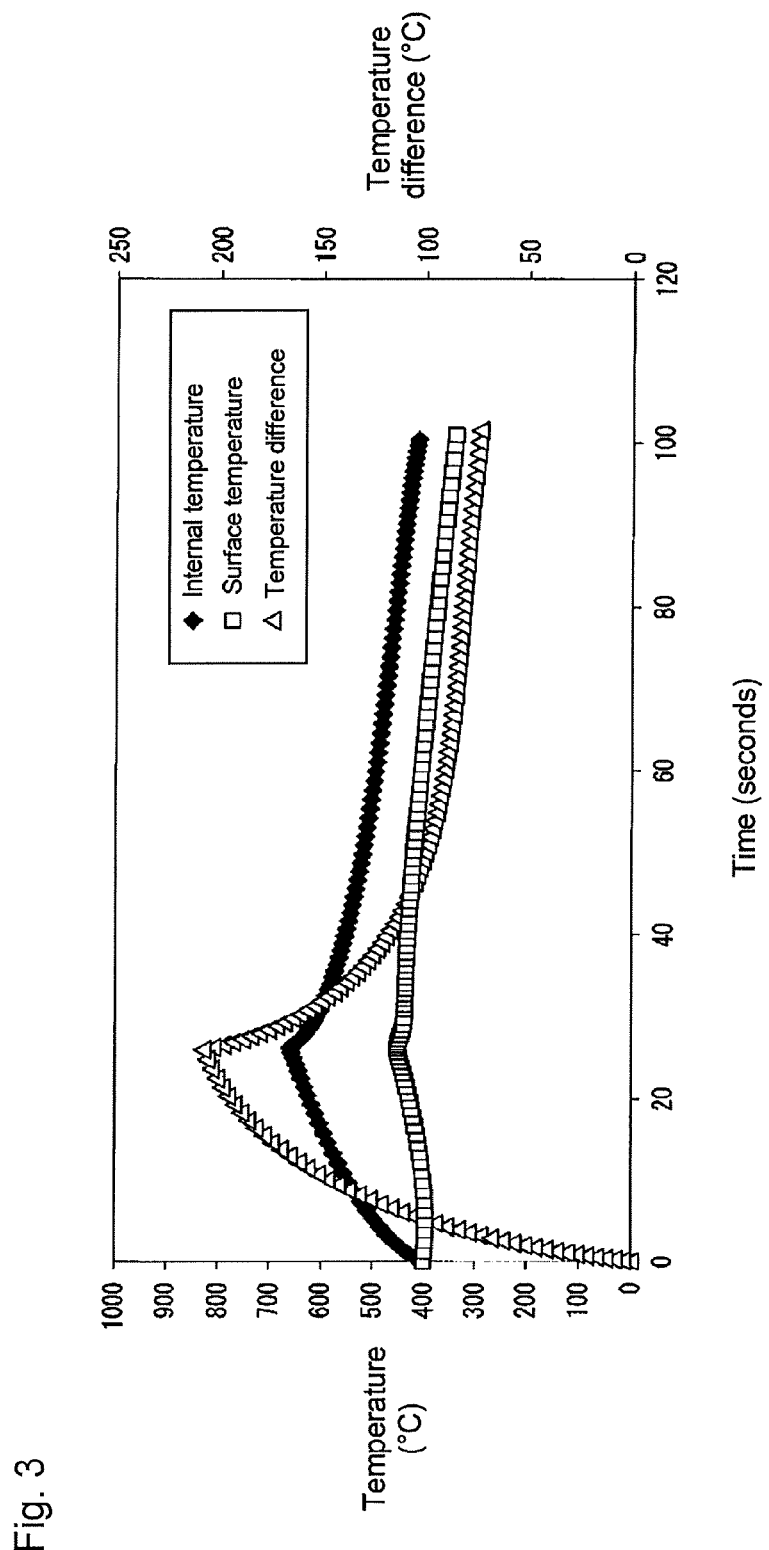
FIG. 3 shows temperature conditions relating to a simulation of a glass plate having a thickness of 10 mm.

FIG. 3 shows the temperature conditions relating to the simulation of the glass plate having a thickness of 10 mm. The horizontal axis of the graph shown in FIG. 3 corresponds to the time (in seconds), the vertical axis on the left side corresponds to the surface or internal temperature (° C.) of the glass plate, and the vertical axis on the right side corresponds to the temperature difference (° C.) between the surface and the interior of the glass plate.

Here, the conditions in this simulation were such that the thickness of the glass plate was (10 mm); the initial surface temperature of the glass plate in the internal heating step was (400° C.); the internal heating (200 kW/m$^2$) and natural cooling (10 W/m$^2$K) were carried out at the same time for 26.5 seconds; and further, forced cooling (100 W/m$^2$K) was then carried out for 120 seconds.

As shown in FIG. 3, as the interior of the glass plate is selectively heated by internal heating, the temperature difference between the internal temperature and the surface temperature gradually increases, and becomes to be about 210° C. at the maximum. Further, the surface temperature does not exceed the strain point.

Figure 4:
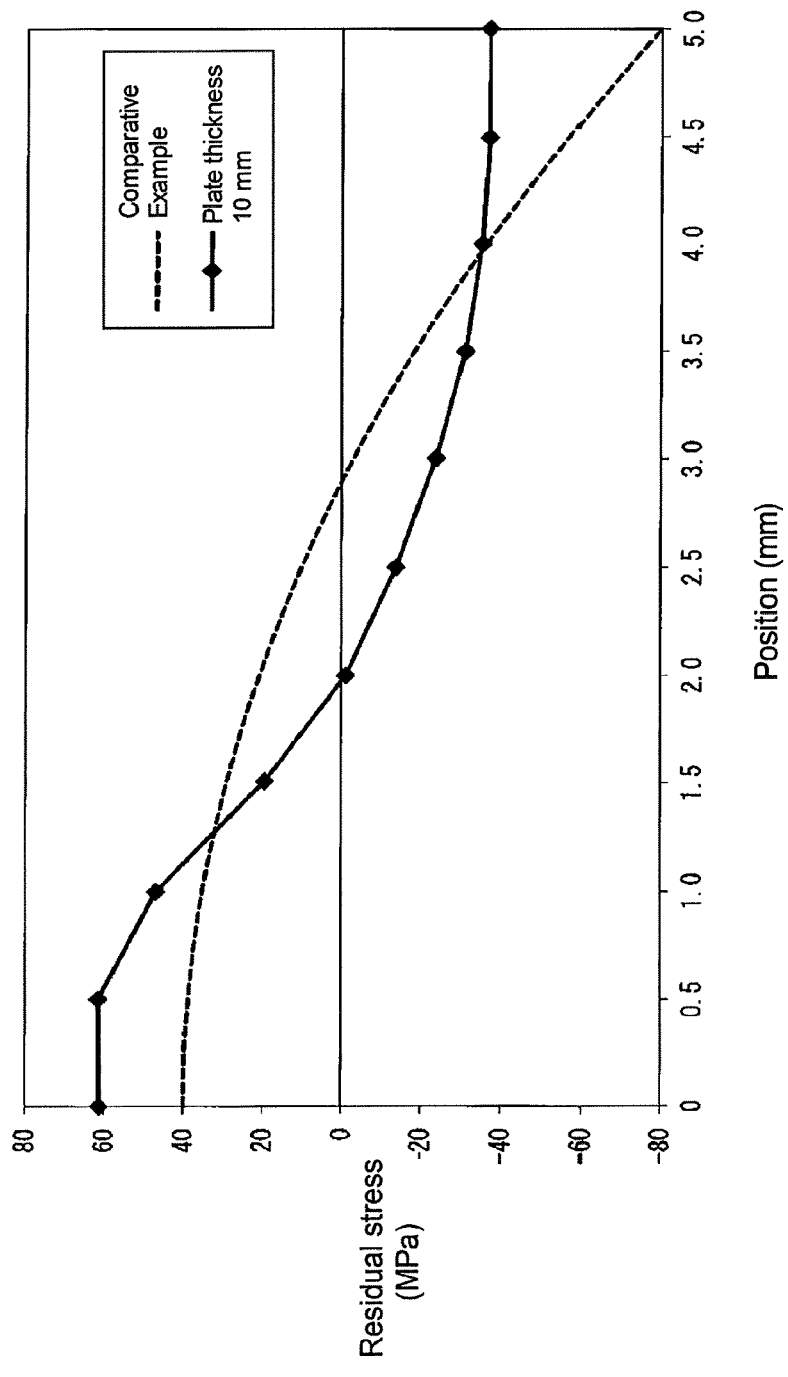
FIG. 4 shows simulation results of the residual stress distribution formed in the glass plate subjected to tempering treatment based on the temperature conditions in FIG. 3.

FIG. 4 shows a simulation result of the stress distribution in the glass plate tempered based on the temperature conditions in FIG. 3. Hereinafter, in the tempered glass plate after the tempering treatment, the direction of the cross section perpendicular to the surface at the center of the front surface and the rear surface will be referred to also as the plate thickness direction of the glass plate. Here, the vertical axis in the graph shown in FIG. 4 represents the residual stress (stress distribution; unit: MPa) of the glass plate after the tempering treatment, and a minus (negative) stress corresponds to the compressive stress component remaining in a direction parallel to the surface in a cross section in the plate thickness direction of the glass plates, and a plus (positive) stress corresponds to a tensile stress component remaining in the direction parallel to the surface in the cross section in the plate thickness direction of the glass plate.

The horizontal axis in the graph shown in FIG. 4 corresponds to the position (mm) in the thickness direction of the glass plate, and the position at 0 mm in the horizontal axis corresponds to the center position of the glass plate, and the position at 5 mm in the horizontal axis corresponds to the surface of the glass plate. Further, in FIG. 4, as a comparative example, the stress distribution (parabolic shape) in the case of using conventional air cooling tempering, is shown.

As shown in FIG. 4, in the case of using conventional air cooling tempering wherein the stress distribution becomes parabolic, the depth of the compressive stress layer which can be formed in the glass plate of 10 mm becomes to be 21% of the thickness, i.e. 2.1 mm. Here, the depth of the compressive stress layer corresponds to the depth from the surface, where the compressive stress component as described above becomes to be zero (the value in the vertical axis in the graph in FIG. 4).

According to the tempering method in the embodiment of the present invention, it was confirmed that a compressive stress layer having a depth of 3 mm (30% of the thickness) can be formed in the surface layer of the glass plate with a thickness of 10 mm. The compressive stress component at the surfaces was 37.2 MPa, and the tensile stress component at the center (corresponding to the center in the cross section) became 62.3 MPa. Therefore, the maximum compression stress component became to be less than 1.6 times, specifically 0.6 time, of the maximum tensile stress component.

Figure 5:
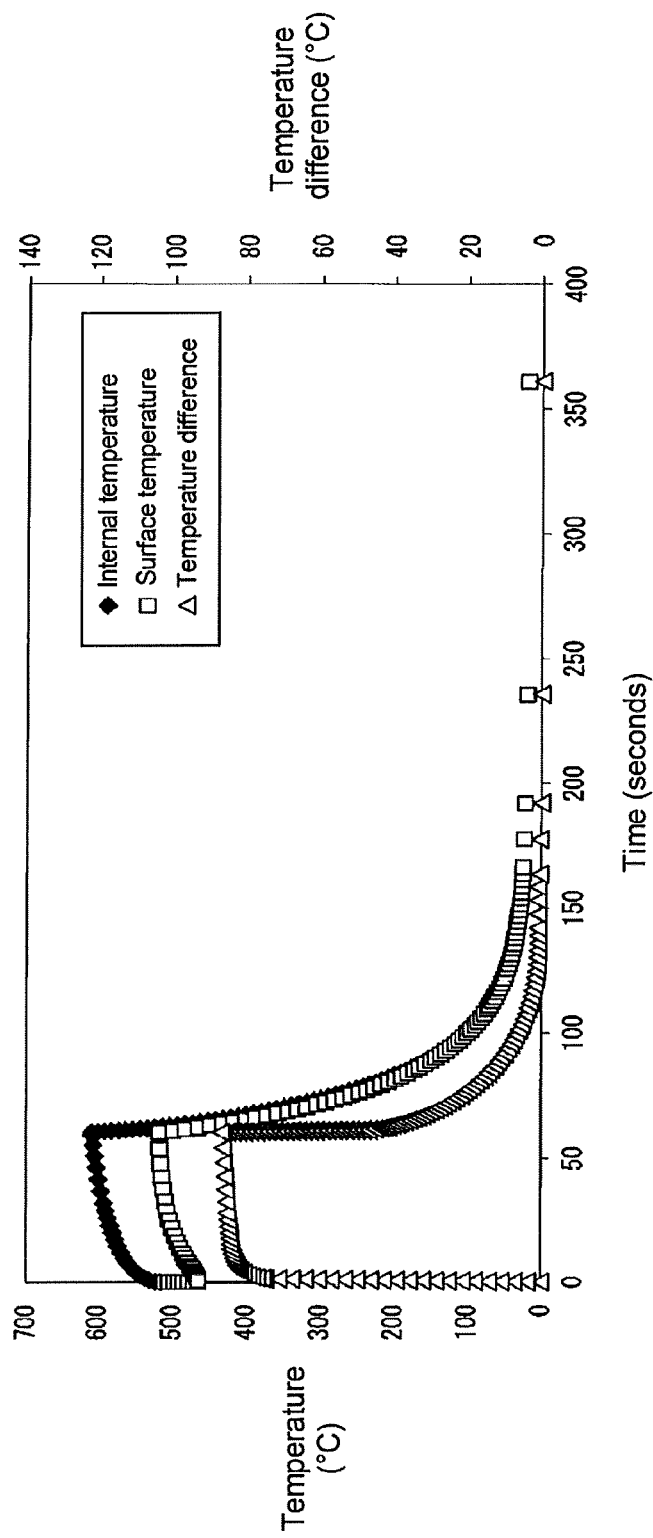
FIG. 5 shows temperature conditions relating to a simulation of a glass plate having a thickness of 2 mm.

FIG. 5 shows temperature conditions of a simulation relating to stress distribution in a glass plate having a plate thickness of 2 mm. The vertical axis and the horizontal axis in FIG. 5 are the same as in FIG. 3, and, therefore, their description will be omitted. Here, conditions for this simulation are such that the thickness of the glass plate was (2 mm); the initial surface temperature of the glass plate in the internal heating step was (500° C.); internal heating (2,000 kW/m$^2$) and forced cooling (200 W/m$^2$K) were carried out at the same time for 60 seconds, and further, forced cooling (200 W/m$^2$K) was then carried out for 300 seconds.

As shown in FIG. 5, immediately after starting the internal heating step, the temperature at the surface of the glass plate is temporarily lowered by the influence of being forcibly cooled, and then gradually increases. And, as the interior of the glass plate is selectively heated by internal heating, the temperature difference between the internal temperature and the surface temperature gradually increases and becomes to be about 84° C. at the maximum. This means that even in the case of a glass plate with a thin plate thickness, it is possible to selectively heat the interior by dielectric heating. Here, the surface temperature exceeds the strain point, but such time is only about a few tens seconds.

Figure 6:
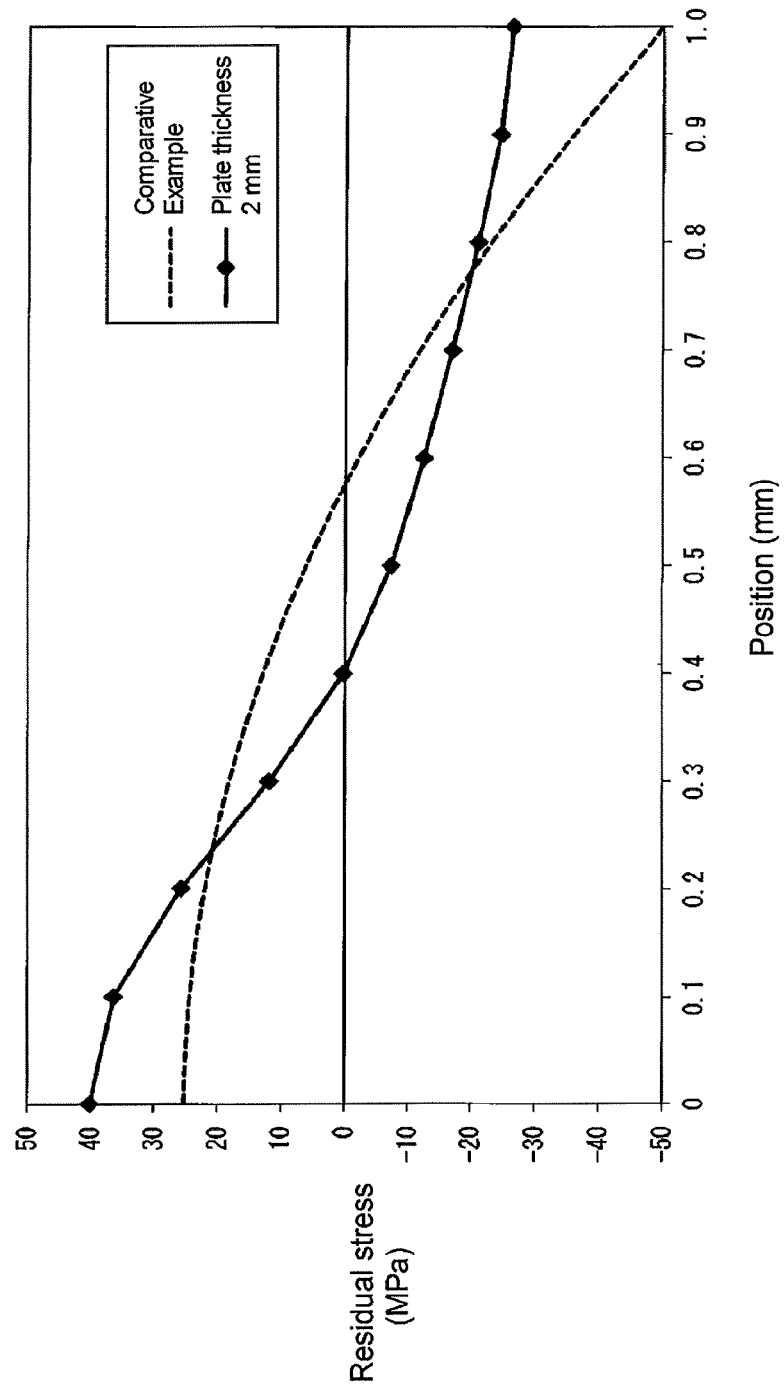
FIG. 6 shows simulation results of the residual stress distribution formed in the glass plate subjected to tempering treatment based on the temperature conditions of FIG. 5.

FIG. 6 shows a simulation result of the stress distribution formed in the glass plate tempered on the basis of the temperature conditions in FIG. 5. Here, the vertical axis in FIG. 6 is the same as in FIG. 4, and therefore, its description will be omitted. The position at 0 mm in the horizontal axis in FIG. 6 corresponds to the center position of the glass plate, and the position at 1 mm in the horizontal axis corresponds to the surface of the glass plate. Further, also in FIG. 6, as a comparative example, the stress distribution (parabolic shape) to be formed in the case of using conventional air cooling tempering is shown.

As shown in FIG. 6, in the case of using conventional air cooling tempering where the stress distribution becomes to be parabolic, the compressive stress depth to be formed in the glass plate of 2 mm becomes to be 21% of the plate thickness, i.e. 0.42 mm. Whereas, according to the embodiment of the present invention, it is possible to form a compressive stress layer having a thickness of 0.6 mm (30% of the plate thickness) in the surface of the glass plate having a plate thickness of 2 mm. The compressive stress at the surface became 26.2 MPa, and the tensile stress at the center became 40.1 MPa. Therefore, the maximum compressive stress became to be less than 1.6 times, specifically 0.7 time, of the maximum tensile stress.

As can be confirmed from the above simulation result, according to the present invention, regardless of the plate thickness of a glass plate, as compared to conventional air cooling tempering, it is possible to form a compressive stress layer deeply in the glass plate. Thus, it is possible to provide a safe tempered glass less susceptible to cracking even if the surface is scratched.

Example 2

Next, an experiment to measure a stress distribution was carried out with respect to a glass plate made of glass with a single matrix composition which was actually tempering-treated by one embodiment of the present invention (hereinafter sometimes referred to as the tempered glass plate). As the glass plate, soda lime glass was used.

Figure 7A:
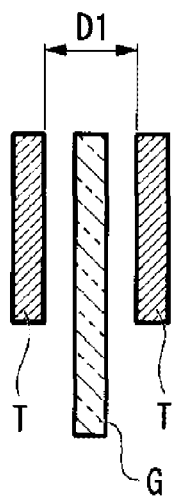
FIGS. 7A and 7B show dimensional relationships between electrodes and a glass plate to be used for dielectric heating.
Figure 7B:
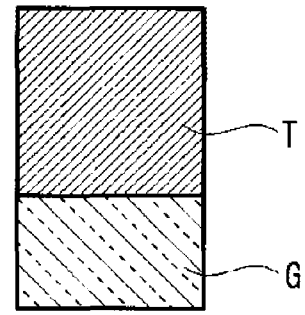

FIGS. 7A and 7B show dimensional relationships between electrodes and the glass plate used for dielectric heating in this experiment, wherein FIG. 7A is a side view showing the dimensional relationship between the electrodes and the glass plate, and FIG. 7B is a plan view showing the dimensional relationship between the electrodes and the glass plate. As shown in FIGS. 7A and 7B, in this experiment, a glass sheet G having a size of vertical 150 mm×horizontal 100 mm, and a thickness of 9.8 mm, was used. Further, the size of a pair of electrodes T to be used for dielectric heating was set to be 100 mm square, and the distance D1 between the electrodes T was set to be 45 mm. That is, in this experiment, the internal temperature of a part of the surface of the glass sheet G was selectively heated by dielectric heating.

In the internal heating step, the interior of the glass plate G was selectively heated by conducting dielectric heating (27.12 MHz; 4 kW; 45 seconds) by placing the glass plate G preheated to 500° C. between a pair of electrodes T. A desired temperature distribution will thereby be formed in the glass plate G (see FIG. 2). Then, in the cooling step, the glass plate was cooled by natural cooling until the temperature of entire glass plate G became to be normal temperature. The surface temperature became 525° C. and thus exceeded the strain point at the completion of the heating step, but the time for exceeding the strain point was within 45 seconds being at least the heating time.

Figure 8:
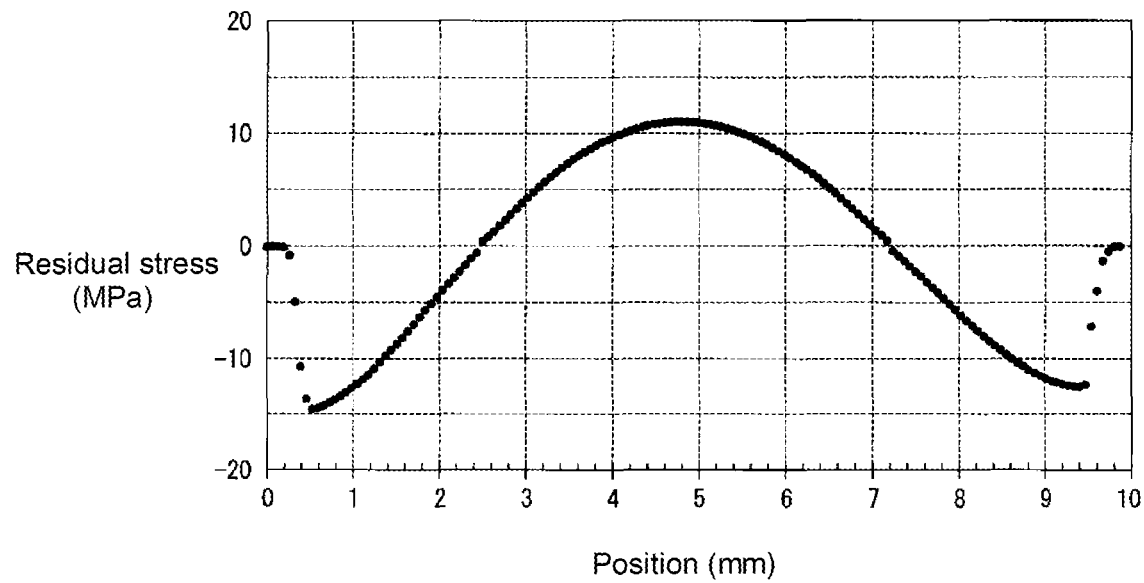
FIG. 8 shows the residual stress distribution in a tempered glass plate produced by an embodiment of the present invention.

FIG. 8 shows the measurement results relating to the stress of the glass plate tempering-treated in one embodiment of the present invention. The vertical axis in the graph shown in FIG. 8 represents the residual stress (MPa) in the glass plate, wherein a minus (negative) residual stress corresponds to a compressive stress, and a plus (positive) residual stress corresponds to a tensile stress. The horizontal axis in the graph shown in FIG. 8 corresponds to the position (mm) in the plate thickness direction of the tempering-treated glass plate, wherein the position at 0 mm in the horizontal axis corresponds to the surface position of the front surface (first main surface) of the tempering-treated glass plate, and the position at 9.8 mm in the horizontal axis corresponds to the surface position of the back surface (second main surface) of the tempering-treated glass plate.

As the measuring device, birefringent two-dimensional distribution evaluation apparatus WPA-100 (manufactured by Photonic Lattice, Inc.) was used. In the measurement, from the tempering-treated glass plate, at the position of 50 mm along the long side of the glass plate, a sample in a strip shape of 100 mm×6 mm was cut out by a blade in the short side direction of the glass plate, followed by lapping and polishing processing of the cut surface to obtain a sample for measurement. By this measuring device, the phase difference (nm) of the glass plate in the case of being irradiated with light from a direction perpendicular to the plane of longitudinal 100 mm×horizontal 9.8 mm of the measurement sample was read. When this phase difference is divided by the light photoelastic constant 25.9 [(nm/cm)/MPa] of the glass plate and 0.6 cm being the thickness in the light transmitting direction, the results of the residual stress in FIG. 8 are obtainable. The read pitch in the thickness direction of the phase difference is 0.066 mm.

Here, at the time of cutting out a sample for measurement from the glass plate, a part of the residual stress in the measurement area is released by the cutting, but, such a phenomenon has been ignored here.

Further, the residual stress is zero in the vicinity of 0 mm and in the vicinity of 9.8 mm on the horizontal axis. In reality, at the surface of the glass, the residual stress should be compressed rather than zero, but in the vicinity of the surface, it is difficult to let the irradiated light go straight, thus leading to such a result as an error. However, the compressive stress showed the maximum value at a position slightly inside from the vicinity of both surfaces, and this value was adopted as the maximum compressive stress.

As shown in FIG. 8, it has been confirmed that according to the tempering method in one embodiment of the present invention, it is possible to form a compressive stress layer (average value at both end portions: 13.6 MPa, maximum value: 14.6 MPa) with a depth of 2.5 mm in average in the surface layer of the glass plate having a plate thickness of 9.8 mm. That is, it has been confirmed that according to the tempering method of the present invention, it is possible to form a compressive stress layer up to 25% of the plate thickness i.e. deeper as compared to the practical upper limit (21% of the plate thickness) by common physical tempering in the case of using a conventional air cooling tempering process. Further, the tensile stress at the interior of the glass plate, became to be 11 MPa at the maximum. As a result, it has been confirmed that in the residual stress distribution, the maximum compressive stress component becomes 1.3 times, i.e. less than 1.6 times, of the maximum tensile stress component. Further, by adjusting the conditions for the above-described tempering treatment, it is possible to adjust the depth of the compression stress layer to be at least 22% of the plate thickness. According to tempered glass by an embodiment of the present invention, the depth of the compression stress layer can be made to be at least 22% of the plate thickness of the glass plate. The upper limit of the depth of the compressive stress layer is not particularly limited, but, since the integral value of the tensile stress and the integral value of the compressive stress are required to be balanced, at most 45% of the plate thickness may be mentioned as an example.

Figure 9:
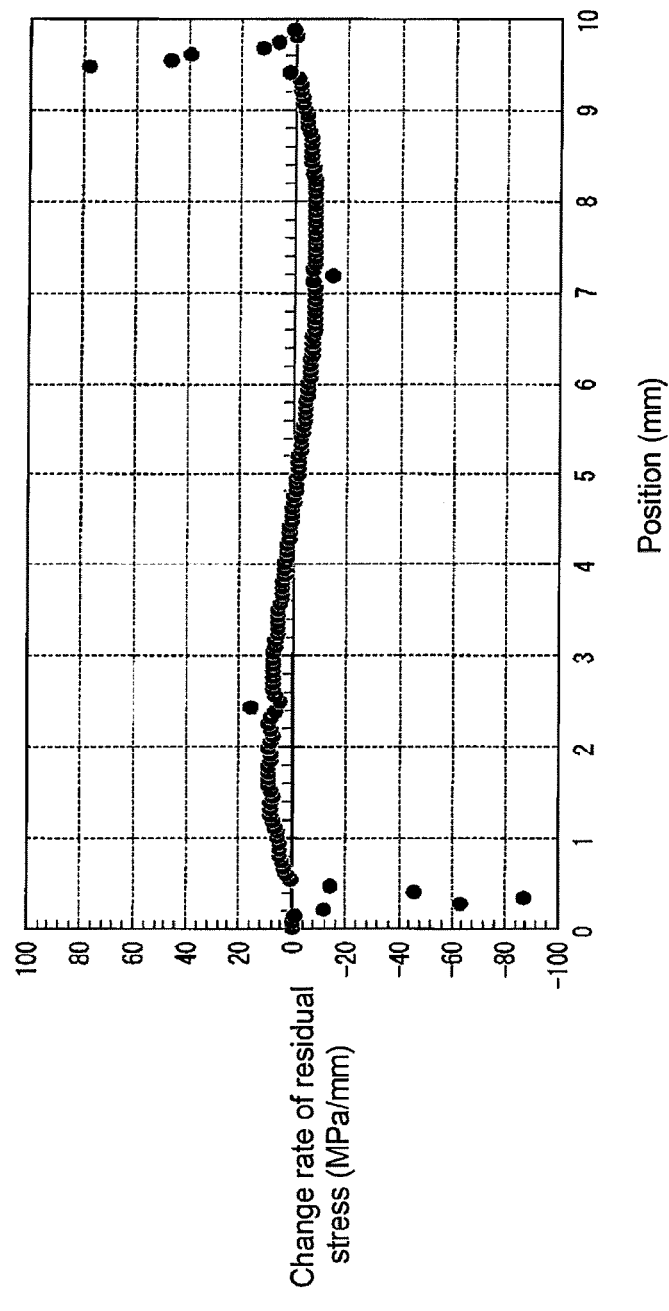
FIG. 9 shows the rate of change in the thickness direction of the residual stress distribution in the tempered glass plate produced by the embodiment of the present invention.

FIG. 9 shows a result of calculating the rate of change in residual stress in the thickness direction from the results of the distribution of residual stress shown in FIG. 8. The horizontal axis in the graph shown in FIG. 9 corresponds to a position (mm) in the thickness direction of the glass plate, wherein the position at 0 mm in the horizontal axis corresponds to the surface position of the front surface (first main surface) of the tempering-treated glass plate, and the position at 9.8 mm in the horizontal axis corresponds to the surface position of the back surface (second main surface) of the tempering-treated glass plate. The vertical axis in the graph shown in FIG. 9 is a value obtained by dividing the difference between the values of residual stress at adjacent points shown in FIG. 8 by 0.066 mm being the read pitch of the phase difference in the thickness direction. At the position of 1.71 mm in the horizontal axis, the change rate in residual stress became to be 9.47. At the position of 7.96 mm in the horizontal axis, the change rate in residual stress became to be −7.60.

In a case where the conventional residual stress becomes parabolic, the rate of change in residual stress becomes to be monotonously decreased from the front surface side (first main surface side) at left in FIG. 9 towards the back side (second main surface side). However, from the results of this time, the rate of change in residual stress has been found to become not to be monotonically decreased. In FIG. 9, it has been found that at the central portion of the glass plate, the change rate is close to monotonical decrease, but towards the front surface or back surface, the change in the change rate tends to be small, and then the absolute value of the change rate turns to decrease. Further, in FIG. 9, it has been found that the absolute value of the change rate becomes maximum between a position where the compressive stress component becomes zero and a position towards the front surface (first main surface), and then, it decreases towards the front surface. That is, the absolute value of the change rate has been found to have at least a region (first region) where it becomes constant or a region (second region) where it decreases towards the front surface, in the range of the compressive stress layer. Further, as mentioned above, in this evaluation, since there is a measurement error in the vicinity of the front surface and the back surface, values of the change rate from the front surface to the position of 0.46 mm, and from the back surface to the position of 9.47 mm, were excluded.

As described above, in the tempered glass plate according to the embodiment of the present invention, the distribution of the residual stress has been found to be a distribution different from the conventional parabolic shape.

Further, according to the tempered glass of the present embodiment, by adjusting the experimental conditions, etc., the compressive stress component in the stress distribution remaining at the surface can be made to be from 5 to 85 MPa. Therefore, in the field where a relatively low compressive stress at the surface is required as tempered glass, it is possible to provide tempered glass having a deep compressive stress layer with a higher surface quality than heretofore.

Example 3

Further, by changing a part of the conditions in Example 2, an experiment to measure the stress distribution was carried out with respect to a glass plate made of glass with a single matrix composition which was actually tempering-treated by another embodiment of the present invention. As the glass plate, soda lime glass was used.

In this experiment, a chemical strengthening-treated glass plate G having a size of vertical 150 mm×horizontal 100 mm and a thickness of 4.7 mm was used. Further, the size of a pair of electrodes T to be used for dielectric heating, was set to be 100 mm square, and the distance D1 between the electrodes T was set to be 15 mm. That is, in this experiment, the internal temperature of a part of the surface of the glass plate G was selectively heated by dielectric heating. The chemical strengthening treatment was carried out by immersing the entire glass plate in a potassium nitrate molten salt. The treatment temperature was 450° C., and the treating time was 150 minutes.

In the internal heating step, by placing a glass plate G preheated to 300° C. between a pair of electrodes T and conducting dielectric heating (27.12 MHz; 2 kW; 300 seconds), the interior of the glass plate G was selectively heated. At the same time, by using a nozzle AFTADW20 (manufactured by MISUMI Corporation) under a feed pressure of 0.4 MPa, a forced convection was formed along the glass surface between the electrodes, whereby the glass surface was cooled. Thus, the desired temperature distribution occurs in the glass plate G. Here, it is not possible to conduct such an operation by the clamp cooling as disclosed in Patent Document 2. The surface temperature became 520° C. i.e. exceeded the strain point at the completion of the heating step, but the time for exceeding the strain point was within 300 seconds being at least the heating time.

Figure 10:
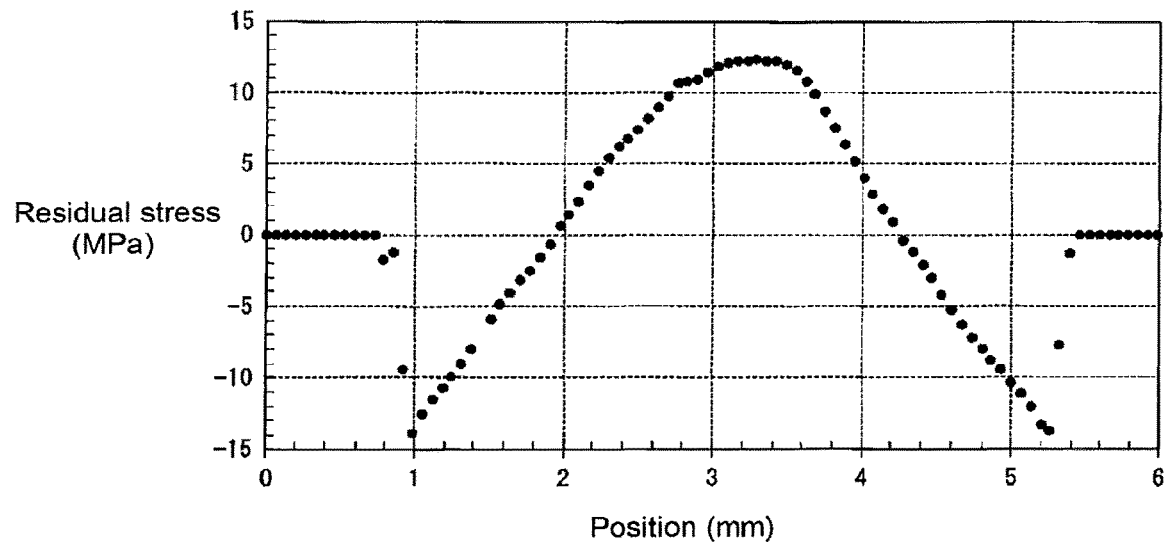
FIG. 10 shows the residual stress distribution in a tempered glass plate produced by another embodiment of the present invention.

FIG. 10 shows the measurement results relating to the stress in the glass plate tempered by an embodiment of the present invention. The vertical axis and the horizontal axis in the graph shown in FIG. 10, are the same as in FIG. 8. However, the position of 0.723 mm in the horizontal axis in the graph shown in FIG. 10 corresponds to the surface position of one (the front surface) of the tempering-treated glass plate, and the position of 5.459 mm in the horizontal axis corresponds to the surface position of the other (the back surface) of the tempering-treated glass plate. For the measurement, from the tempering-treated glass plate, at the position of 50 mm along the long side of the glass plate, a strip-shaped measurement sample of vertical 100 mm×horizontal 7 mm was cut out by a blade in the short side direction of the glass plate, followed by lapping and polishing of the surface of the cut portion to obtain a sample for measurement.

Then, the phase difference (nm) in the glass plate in a case where light is irradiated from a direction perpendicular to the plane of longitudinal 100 mm×horizontal 4.7 mm of the measurement sample, is read by the birefringence 2-dimensional distribution evaluation apparatus WPA-100 as used in Example 2. When this phase difference is divided by a photoelastic constant of 25.9 [(nm/cm)/MPa] of the glass plate and 0.7 cm being the thickness in the direction of passing light, the results of residual stress in FIG. 10 are obtainable. The read pitch in the thickness direction of the phase difference is 0.066 mm.

The stress and the depth of the residual stress by the chemical strengthening treatment of the chemical strengthening-treated glass plate before being tempered by dielectric heating, were measured by a surface stress measuring apparatus using the principle of photoelasticity manufactured by Orihara Industrial Co., Ltd. (Model FSM-6000LE).

As a result, the compressive stress component of the residual stress at the surface of the glass plate by chemical strengthening treatment was 629 MPa, and the depth of the residual stress by the chemical strengthening treatment was 9.5 µm from the surface.

The compressive stress component of the residual stress at the surface of the glass plate by chemical strengthening treatment after being tempered by dielectric heating was 630 MPa, and the depth of the residual stress by the chemical strengthening treatment was 11.4 µm from the surface.

As shown in FIG. 10, it has been confirmed that it is possible to form a compressive stress layer (average value at both end portions: 13.75 MPa, maximum value: 18.8 MPa) having a thickness of 1.25 mm on average in the surface layer of the chemical strengthening-treated glass plate with a plate thickness of 4.7 mm by the tempering method of one embodiment of the present invention. That is, it has been confirmed that according to the tempering method of the embodiment of the present invention, it is possible to form a compressive stress layer of up to 26% of the plate thickness i.e. deeper as compared with the theoretical limit (21% of the plate thickness) in the case of using a conventional air cooling tempering step. Further, the tensile stress in the interior of the glass plate became 12.3 MPa at the maximum. As a result, it has been confirmed that in the residual stress distribution by dielectric heating, the maximum compressive stress component becomes 1.1 times and less than 1.6 times, of the maximum tensile stress component. Here, in the tempered plate in the embodiment of the present invention, the depth from the first main surface, where the compressive stress component in a direction parallel to the first main surface in the stress distribution remaining in a cross section perpendicular to the first main surface at the center between the first main surface and the second main surface, becomes zero, is not the depth by the residual stress due to chemical strengthening treatment.

In fact, at the surface of this measurement sample, the residual stress distribution due to the chemical strengthening treatment is also present, and therefore, at the surface, a residual compressive stress of 630 MPa due to chemical strengthening treatment remains, and in the interior, a compressive stress of 11.4 µm due to chemical strengthening treatment is also present.

In a tempered glass plate having tempering treatment of the present invention applied to a chemical strengthening-treated glass plate as in this embodiment, it is possible to adjust the compressive stress component in the stress distribution remaining at the surface to be from 100 to 2,000 MPa. Therefore, in the field where a relatively high compressive stress at the surface is required as tempered glass, it is possible to provide a tempered glass having a deep compressive stress layer with a surface quality higher than heretofore.

The compressive stress at the surface of the glass plate due to chemical strengthening treatment after the tempering treatment by dielectric heating, is measured by the above-mentioned FSM-6000LE, and will be a value having a compressive stress at the surface due to dielectric heating superimposed from the measurement principle. On the other hand, with respect to the compressive stress in the vicinity of the surface measured by the above-mentioned WPA-100 after tempering treatment by dielectric heating, from the characteristics, the compressive stress component due to chemical strengthening treatment may be negligible. Therefore, the compressive stress at the surface and in the vicinity of the surface is found to be separable between one due to chemical strengthening treatment and one due to dielectric heating.

Figure 11:
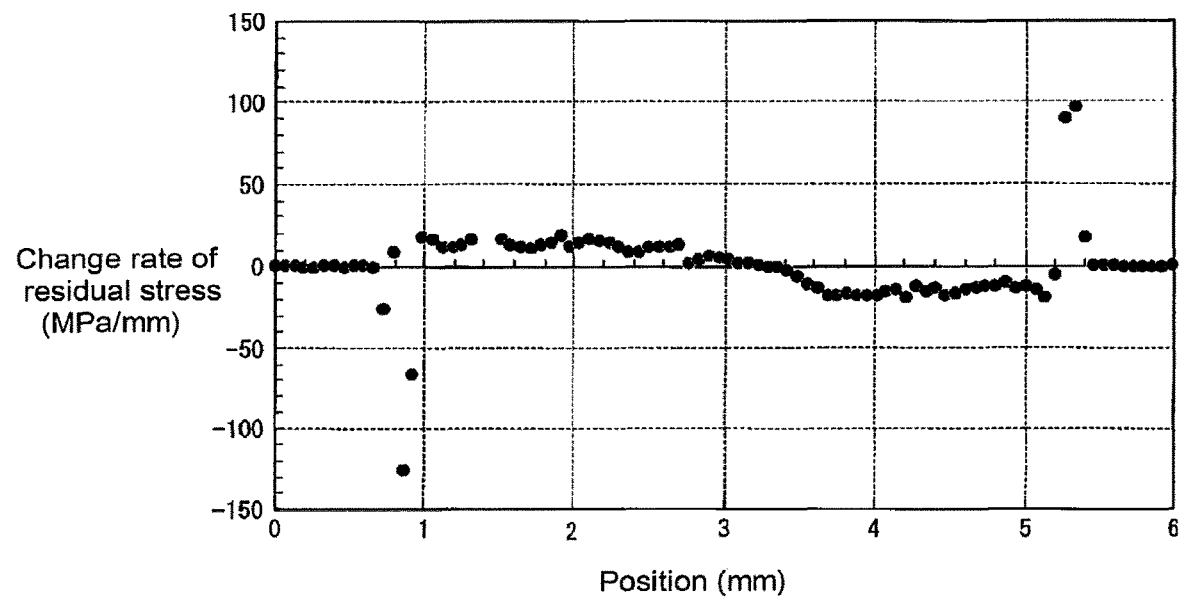
FIG. 11 shows the rate of change in the thickness direction of the residual stress distribution in the tempered glass plate produced by another embodiment of the present invention.

FIG. 11 shows a result of calculation of the rate of change in residual stress in the thickness direction from the results of the distribution of residual stress shown in FIG. 10. The horizontal axis in the graph shown in FIG. 11 corresponds to the position (mm) in the plate thickness direction of the tempering-treated glass plate, and the position of 0.723 mm in the horizontal axis corresponds to the surface position of one (front surface) of the tempering-treated glass plate, and the position of 5.459 mm in the horizontal axis corresponds to the surface position of the other (back surface) of the tempering-treated glass plate. The vertical axis in the graph shown in FIG. 11 represents a value obtained by dividing the difference between the values at adjacent points of the residual stress values shown in FIG. 10 by 0.066 mm as the read pitch in the thickness direction of the phase difference. At the point of 0.986 mm on the horizontal axis, the change rate of the residual stress became to be 18.11. At the point of 5.13 mm on the horizontal axis, the change rate of the residual stress became to be −19.44.

From the above results, it has been found that the rate of change in residual stress becomes not to be a monotonic decrease. In FIG. 11, it has been found that in the region excluding the center of the glass plate, the change in the change rate becomes to be small. Further, it has been found that the absolute value of the change rate becomes to be maximum between a position where the compressive stress component becomes to be zero and a position towards the surface, and then, becomes to be smaller toward the surface. That is, it has been found that within the range of compression stress layer, the absolute value of the change rate has at least one of a region (first region) wherein it is constant or a region (second region) where it decreases towards the surface. Further, as mentioned above, in this evaluation, there is a measurement error in the vicinity of the front surface and the back surface, and therefore, values of the change rate from the front surface to the position of 0.92 mm and from the back surface to the position 5.26 mm were excluded. As described above, it has been found that in the tempered glass of the present invention, the distribution of the residual stress is different from the conventional parabolic shape.

This application is a continuation of PCT Application No. PCT/JP2017/006425, filed on Feb. 21, 2017, which is based upon and claims the benefit of priority from Japanese Patent Application No. 2016-035876 filed on Feb. 26, 2016 and Japanese Patent Application No. 2016-218290 filed on Nov. 8, 2016. The contents of those applications are incorporated herein by reference in their entireties.

REFERENCE SYMBOLS

11: tempered glass plate, 11a: compressive stress layer, 11b: tensile stress layer, G1: glass plate, O2: stress distribution, T2: temperature distribution, S1: preparation step, S2: internal heating step, S3: cooling step.

What is claimed is:

1. A tempered glass plate made of glass with a single matrix composition and having a first main surface and a second main surface opposed to each other,
    wherein the tempered glass plate has a compressive stress layer at its surface, and
    wherein in the distribution of stress remaining in a cross section passing through the center of the first main surface and being perpendicular to the first main surface, a depth from the first main surface where the compressive stress component in a direction parallel to the first main surface becomes zero, is at least 22% of a plate thickness of the tempered glass plate.

2. The tempered glass plate according to claim 1, which has at least one of a first region and a second region in a range from the first main surface to a position where the above compressive stress component becomes zero, wherein
    the first region is a region where an absolute value of a change rate of the stress distribution in the plate thickness direction of the tempered glass plate becomes constant, and
    the second region is a region where the absolute value decreases towards the first main surface.

3. The tempered glass plate according to claim 1, wherein in the stress distribution, the absolute value of the change rate in the plate thickness direction of the tempered glass plate becomes maximum between a position where the compressive stress component becomes zero and the first main surface, and then decreases towards the first main surface.

4. The tempered glass plate according to claim 1, wherein in the stress distribution, the compressive stress component at the first main surface is less than 1.6 times a tensile stress component at a center of the cross-section.

5. The tempered glass plate according to claim 1, wherein the compressive stress component at the first main surface is from 5 to 85 MPa.

6. The tempered glass plate according to claim 1, which has a compressive stress layer formed by ion exchange at least at the first main surface.

7. The tempered glass plate according to claim 6, wherein the compressive stress component at the first main surface is from 100 to 2,000 MPa.

8. The tempered glass plate according to claim 1, wherein the plate thickness is from 0.5 to 25 mm.

9. The tempered glass plate according to claim 6, wherein the tempered glass plate is made by the method comprising:
    maintaining a surface temperature of a glass plate made of a glass with a single matrix composition at at most a strain point of the glass;
    internally heating the glass plate such that the internal temperature of the glass plate to be at least an annealing point of the glass, while maintaining the surface temperature of the glass plate to be higher than the strain point and at most the annealing point within 10 minutes, or to be at most the strain point; and
    cooling the glass plate.

* * * * *